United States Patent
Ginzburg et al.

(10) Patent No.: US 7,489,650 B2
(45) Date of Patent: Feb. 10, 2009

(54) METHOD, APPARATUS AND SYSTEM OF PACKET TRANSMISSION

(75) Inventors: Boris Ginzburg, Haifa (IL); Rony Ross, Tel-Aviv (IL); Vladimir Kondratiev, Haifa (IL)

(73) Assignee: Intel Corporation, Santa Clara, CA (US)

( * ) Notice: Subject to any disclaimer, the term of this patent is extended or adjusted under 35 U.S.C. 154(b) by 581 days.

(21) Appl. No.: 10/810,687

(22) Filed: Mar. 29, 2004

(65) Prior Publication Data

US 2005/0213554 A1 Sep. 29, 2005

(51) Int. Cl.
*H04Q 7/20* (2006.01)

(52) U.S. Cl. .................. 370/314; 370/328; 370/329; 370/252; 370/445

(58) Field of Classification Search .......... 370/229, 370/235, 351, 389, 412, 310, 328, 338, 395.1, 370/396, 397, 392, 234, 231, 241, 252, 230, 370/232, 233, 253, 329, 314, 346, 349, 445, 370/449; 714/100, 1, 48, 55, 755, 721; 709/224, 709/229; 713/156

See application file for complete search history.

(56) References Cited

U.S. PATENT DOCUMENTS

| | | | | |
|---|---|---|---|---|
| 6,252,854 | B1 * | 6/2001 | Hortensius et al. | 370/252 |
| 6,978,151 | B2 * | 12/2005 | Choi et al. | 455/522 |
| 2002/0061031 | A1 * | 5/2002 | Sugar et al. | 370/466 |
| 2003/0152086 | A1 * | 8/2003 | El Batt | 370/400 |
| 2003/0169763 | A1 * | 9/2003 | Choi et al. | 370/462 |
| 2004/0165564 | A1 * | 8/2004 | Kim et al. | 370/338 |
| 2004/0264600 | A1 * | 12/2004 | Kao et al. | 375/316 |
| 2005/0032478 | A1 * | 2/2005 | Stephens et al. | 455/67.11 |
| 2005/0044464 | A1 * | 2/2005 | Costa et al. | 714/746 |
| 2005/0053037 | A1 | 3/2005 | Ginzburg et al. | |
| 2005/0122989 | A1 | 6/2005 | Ginzburg et al. | |
| 2005/0128970 | A1 * | 6/2005 | Tsien et al. | 370/315 |
| 2005/0141459 | A1 * | 6/2005 | Li et al. | 370/334 |
| 2005/0147071 | A1 * | 7/2005 | Karaoguz et al. | 370/338 |

OTHER PUBLICATIONS

Daji Qiao and Sunghyun Choi, "Goodput Enhancement of IEEE 802.11a Wireless LAN via Link Adaption", in Proc-IEEE ICC' 2001, Helsinki, Finland, Jun. 2001, pp. 1995-2000.

Jim Geier, "Improving WLAN Performance with RTS/CTS", http://www.80211-planet.com/tutorials/article.php/1445641.

Jim Geier, "Improving WLAN Performance witth Fragmentation", http://www.80211-planet.com/tutorials/article.php/1468331.

Jim Geier, "Sizing Up Your WLAN", http://www.80211-planet.com/tutorials/article.php/992011.

Matthew S. Gast, "802.11 Wireless Networks" The Definitive Guide, O' Reilly 2002.

(Continued)

*Primary Examiner*—Jean A Gelin
(74) *Attorney, Agent, or Firm*—Schwegman, Lundberg & Woessner, P.A.; Gregory J. Gorrie

(57) ABSTRACT

Embodiments of the present invention provide a method, apparatus and system which may include selecting, based on a predetermined criterion, a modulation type and/or a protection mechanism to be used for transmission of a data packet, e.g., in wireless LAN communication system. Other embodiments are described and claimed.

10 Claims, 3 Drawing Sheets

OTHER PUBLICATIONS

Bob O;Hara and Al Petrick, "The IEEE 802.11 Handbook, A Designers Companion" IEEE 1999.

IEEE Std 802.11b-1999, Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band.

IEEE Std 802.11g-2003, IEEE Standard for Information Technology—Telecommunications and information exchange between systems—Local and metropolitan area networks—Specific requirements—Part 11: Wireless LAN Medium Access Control (MAC) and Physical Layer (PHY) specifications Amendment 4: Further Higher Data Rate Extension in the 2.4 GHz Band.

* cited by examiner

METHOD, APPARATUS AND SYSTEM OF PACKET TRANSMISSION

BACKGROUND OF THE INVENTION

In wireless local area networks (WLAN), network stations may use a channel access mechanism and a control mechanism to protect transportation of packets over the network. An example of an access mechanism may be a Carrier Sense Multiple Access with Collision Avoidance (CSMA/CA) and, more specifically, CSMA/CA with a binary exponential backoff method. A Request To Send/Clear To Send (RTS/CTS) protection mechanism included in the CSMA/CA mechanism may be used to protect packet transportation.

Some "802.11g stations", i.e., stations operating in accordance with the 802.11g standard, may use the RTS/CTS protection mechanism to protect an "OFDM data packet", i.e., a data packet modulated using Orthogonal Frequency Multiplexing (OFDM) modulation, from collision with a transmission of a "legacy station", e.g., a station operating in accordance with the 802.11b standard. Other "802.11g stations" may use a CTS-to-self protection mechanism to protect the "OFDM data packet".

This may result in a reduced communication throughput, since the protection mechanism may include transmitting RTS and/or CTS packets at a transmission rate for Direct Sequence Spread Spectrum/Complementary Code Keying (DSSS/CCK), which may be lower than a transmission rate used for transmitting the OFDM data packet.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
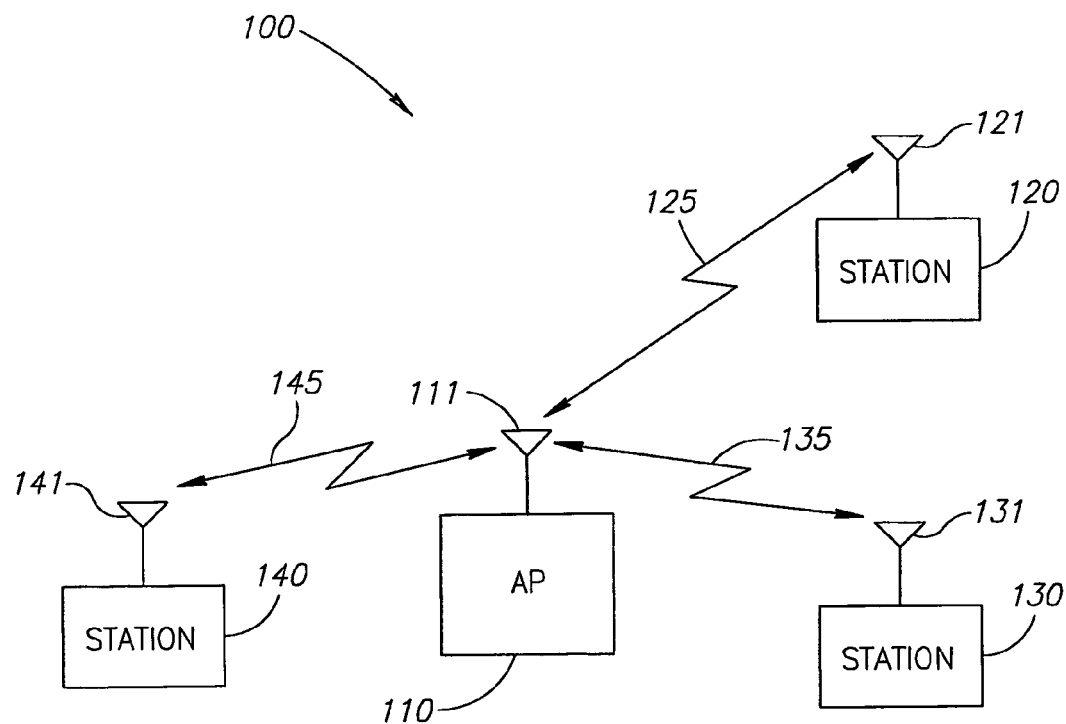
FIG. 1 is a schematic diagram of a wireless communication system in accordance with some exemplary embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as units of a wireless communication system, for example, a Wireless Local Area Network (WLAN) communication system and/or in any other unit and/or device. Units of a WLAN communication system intended to be included within the scope of the present invention include, by way of example only, modems, Mobile Units (MU), Access Points (AP), wireless transmitters/receivers, and the like.

Types of WLAN communication systems intended to be within the scope of the present invention include, although are not limited to, WLAN communication systems as described by "IEEE-Std 802.11, 1999 Edition (ISO/IEC 8802-11: 1999)" standard ("the 802.11 standard"), and more particularly in "IEEE-Std 802.11b-1999 Supplement to 802.11-1999, Wireless LAN MAC and PHY specifications: Higher speed Physical Layer (PHY) extension in the 2.4 GHz band" ("the 802.11b standard"), and "IEEE-Std 802.11g-2003 Supplement to 802.11-1999, Wireless LAN MAC and PHY specifications: Further Higher Data Rate Extension in the 2.4 GHz band, Draft 8.2" ("the 802.11g standard"), and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Reference is made to FIG. 1, which schematically illustrates a wireless communication system 100 in accordance with an embodiment of the present invention.

In some exemplary embodiments of the invention, communication system 100 may include a WLAN system. Although the scope of the present invention is not limited in this respect, communication system 100 may be defined, by the 802.11 standard, as a Basic Service Set (BSS). For example, the BSS may include at least one communication station, for example, an AP 110, and stations 120, 130, and 140 at least one of which may be a MU. In some embodiments, stations 140, 130 and 120 may transmit and/or receive one or more packets over wireless communication system 100. The packets may include data, control messages, network information, and the like. Additionally or alternatively, in other embodiments of the present invention, wireless communication system 100 may include two or more APs and two or more mobile stations, in which case wireless communication system 100 may be referred to as an extended service set (ESS), as defined by the 802.11 standard, although the scope of the present invention is not limited in this respect.

According to exemplary embodiments of the invention, AP 110 may include one or more antennas 111 for transmitting and/or receiving packets, e.g., to/from stations 120, 130 and/or 140. Stations 120, 130 and/or 140 may include one or more antennas 121, 131 and/or 141, respectively, for transmitting and/or receiving packets, e.g., to/from AP 110. Although the scope of the present invention is not limited in this respect, types of antennae that may be used for antennas 111, 121, 131, and/or 141 may include but are not limited to internal antenna, dipole antenna, omni-directional antenna, a monopole antenna, an end fed antenna, a circularly polarized antenna, a micro-strip antenna, a diversity antenna and the like.

According to some exemplary embodiments of the invention, system 100 may include a "mixed client system", i.e., one or more stations of system 100, e.g., station 140, may include a "legacy" communication device, e.g., able to operate in accordance with the 802.11b standard, and one or more stations of system 100, e.g., station 120, may include a "multi-modulation" communication device, e.g., able to modulate a data packet using one of two or more modulation types, e.g., in accordance with the 802.11g standard. For example, although the invention is not limited by this example, in some embodiments station 140 may be able to modulate and/or demodulate data packets using a Direct Sequence Spread Spectrum/Complementary Code Keying (DSSS/CCK) modulation, and station 120 may be able to modulate and/or demodulate data packets using either DSSS/CCK modulation or an Orthogonal Frequency Division Multiplexing (OFDM) modulation.

According to exemplary embodiments of the invention, AP 110 may include suitable WLAN AP communication circuitry, for example, AP circuitry able to operate in accordance with the 802.11g standard and/or any other suitable standard. For example, AP 110 may be able to control communication between AP 110 and stations 120, 130 and/or 140 by sending control commands of a packet protection mechanism, e.g., via beacons 125, 135, 145, if desired. For example, AP 110 may implement a Carrier Sense, Multiple Access/Collision Avoidance (CSMA/CA) mechanism, which may include a Request-To-Send/Clear-To-Send (RTS/CTS) mechanism, which may be used to provide collision protection to the transmission of a data frame, if desired.

AP 110 may be able to inform a multi-modulation station that one or more legacy stations are present in communication system 100. For example, AP 110 may use beacon 125 to inform station 120 that legacy station 140 is present in communication system 100, e.g., by sending a "Non ERP presented" bit, as is known in the art. In such a case, according to exemplary embodiments of the invention, station 120 may be able to determine, based on predetermined criteria, whether or not to protect a data packet to be transmitted, e.g., for reception by AP 110, and/or to select a suitable protection mechanism from two or more protection mechanisms, as described below.

According to some exemplary embodiments, system 100 may include a "hidden node", for example, station 130, which may be referred to herein as "hidden station". In contrast, stations 120, 140 and AP 110, for example, may be referred to herein as "visible stations" because they may receive all transmissions from other stations. However, a hidden station, for example, station 130 may receive transmissions from one station, for example, AP 110, and may not receive transmissions from other stations, e.g., stations 120 and 140.

Figure 2:
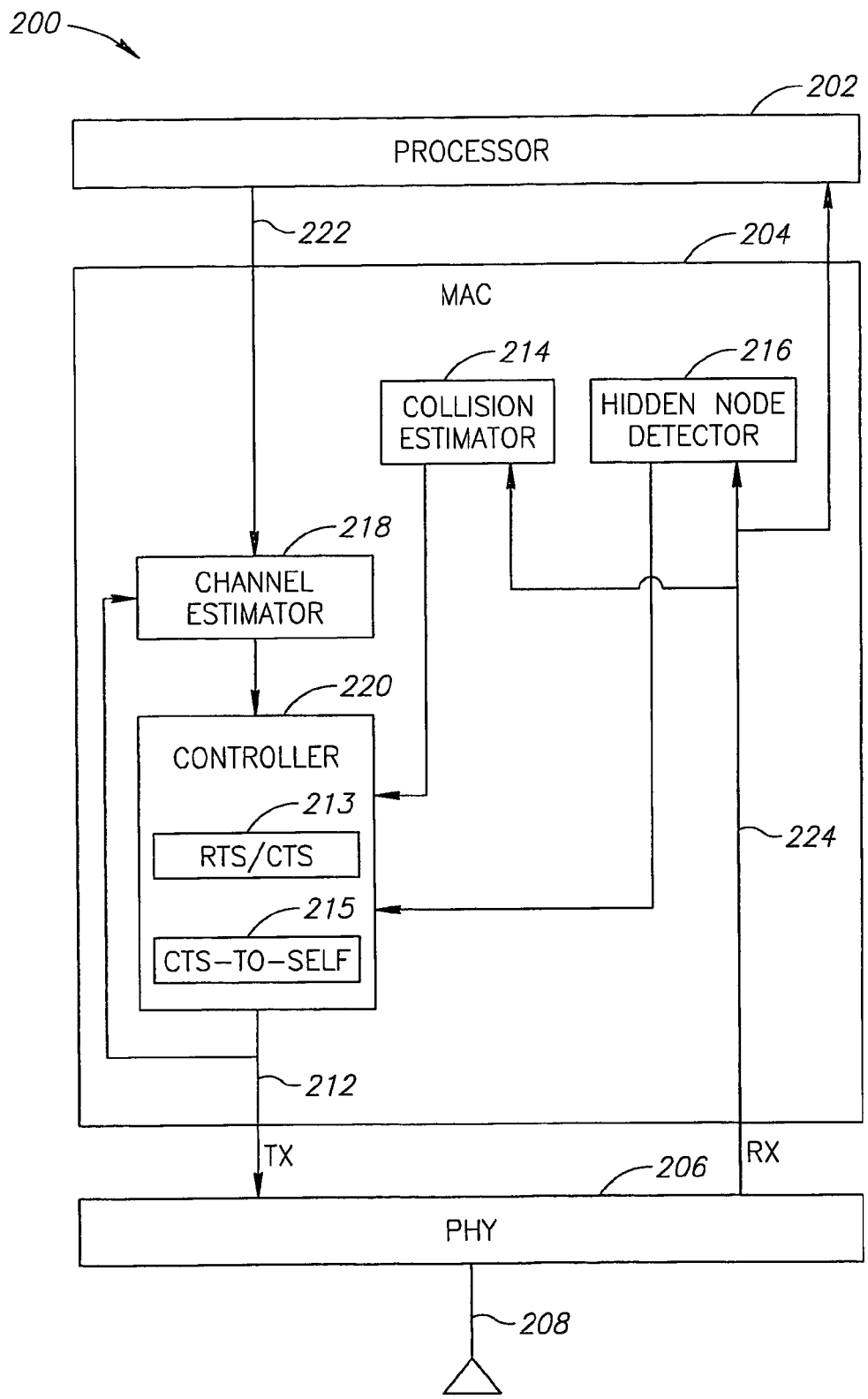
FIG. 2 is a schematic illustration of a communication station in accordance with some exemplary embodiments of the invention.

Reference is made to FIG. 2, which schematically illustrates a station 200 in accordance with some exemplary embodiments of the invention.

According to exemplary embodiments of the invention, station 200 may include a station able to modulate a data packet to be transmitted to another station, e.g., to AP 110 (FIG. 1), using one of two or more modulation types, e.g., the DSSS/CCK and the OFDM modulation types. For example, station 200 may include a multi-modulation station, e.g., station 120 (FIG. 1).

According to exemplary embodiments of the invention, station 200 may include a processor 202, which may be associated with a memory (not shown). Processor 202 may process data packets of signals 224 received via at least one antenna 208 and/or data packets of signals 222 intended for transmission via antenna 208.

According to exemplary embodiments of the invention station 200 may also include a Media Access Control (MAC) module 204 associated with processor 202, and a Physical (PHY) layer 206 associated with MAC 204 and antenna 208, as are described in detail below.

According to exemplary embodiments of the invention, MAC 204 may include a channel estimator 218, a controller 220, a collision estimator 214 and a hidden node detector 216. Hidden node detector 216 may include any suitable hardware and/or software for detecting a hidden node, e.g., station 130 (FIG. 1), for example, based on one or more received packets of signal 224, as is known in the art. Hidden node detector 216 may detect the hidden node, for example, by monitoring frames and/or packets received from other stations. For example, hidden node detector 216 may detect a hidden node, e.g., station 130, if a CTS packet from AP 110 (FIG. 1) is received but the corresponding RTS packet, e.g., from station 130, is not received, and the channel is sensed as clear before the CTS packet is received. Additionally or alternatively, hidden node detector 216 may detect a hidden node, e.g., station 130, if an acknowledgement (ACK) message, e.g., from AP 110 to station 130, is received by station 200, but a corresponding packet from station 130 is not received by station 200, and the channel is sensed as clear before the ACK message is received.

According to exemplary embodiments of the invention, collision estimator 214 may include any suitable hardware and/or software for estimating a probability, P, of a transmission collision, e.g., between a packet transmitted by station 200 and a packet transmitted by another station, as is known in the art. Such probability estimation may take into account, for example, an estimated Number of Active Stations (NAS) in the communication network system, e.g. system 100 (FIG. 1), suitable properties of the communication network system, suitable properties of one or more stations in the communication network system, suitable properties of one or more APs in the communication network system, analysis of transmitted and/or received data, parameters, properties, packets and/or frames in the communication network system, and/or any other suitable information.

According to exemplary embodiments of the invention, channel estimator 218 may include any suitable hardware and/or software for estimating one or more attributes of a channel, e.g., between station 200 and a station, e.g., AP 110 (FIG. 1), which is intended to receive a data packet from station 200, and determining a current transmission rate, $r_1$, for DSSS/CCK and/or a current transmission rate, $r_2$, for OFDM as are known in the art. For example, the 802.11b standard defines transmission rates of 1, 2, 5.5, and 11 Mega bit per second (Mbps) for DSSS/CCK, and the 802.11g standard defines transmission rates of 6, 9, 12, 18, 24, 36, 48, and 54 Mbps for OFDM. Estimator 218 may be able to determine, e.g., based at least on the estimated channel attributes and/or a transmission range between station 200 and AP 110 (FIG. 1), which of the defined transmission rates for DSSS/CCK is the current, e.g., maximal available, transmission rate for DSSS/CCK, and/or which of the defined transmission rates for OFDM is the current, e.g., maximal available, transmission rate for OFDM. Estimator 218 may be also able to select a current preferred transmission rate, e.g., including either the current transmission rate for DSSS/CCK or the current transmission rate for OFDM, as known in the art.

According to exemplary embodiments of the invention, controller 220 may include an RTS/CTS protection mechanism 213 and/or a CTS-to-self protection mechanism 215, as are known in the art, to protect a data packet to be transmitted via antenna 208.

According to some exemplary embodiments of the invention, station 200 may operate in a "mixed client" communication system, e.g., system 100, including at least one legacy station, e.g., station 140 (FIG. 1). In these exemplary embodiments of the invention, controller 220 may be able to select, e.g., based on a predetermined criterion, between modulating the data packet using a first, e.g., the OFDM, modulation type and protecting the data packet using the RTS/CTS protection mechanism, modulating the data packet using the first modulation type and protecting the data packet using the CTS-to-self protection mechanism, and modulating the data packet using a second, e.g., the DSSS/CCK, modulation type, as described in detail below.

Alternatively, if for example, the communication system includes only multi-modulation stations, e.g., no legacy stations are present, then controller 220 may use RTS/CTS protection mechanism 213 for protecting the data packet when a hidden node, e.g., station 140, is detected by detector 216, as known in the art.

According to exemplary embodiments of the invention, controller 220 may also be able to provide PHY layer 206 with a transmit command 212 including the data packet to be transmitted. Transmit command 212 may also include one or more instruction frames including modulation instructions corresponding to a modulation type for modulating the data packet and/or protection instructions corresponding to a protection mechanism for protecting the data packet, as described below. PHY layer 206 may include any suitable software and/or hardware, as is known in the art, to modulate and transmit the data packet and/or the one or more protection frames of transmit command 212 via antenna 208 and/or to provide MAC 204 with received packets 224 from antenna 208.

Figure 3:
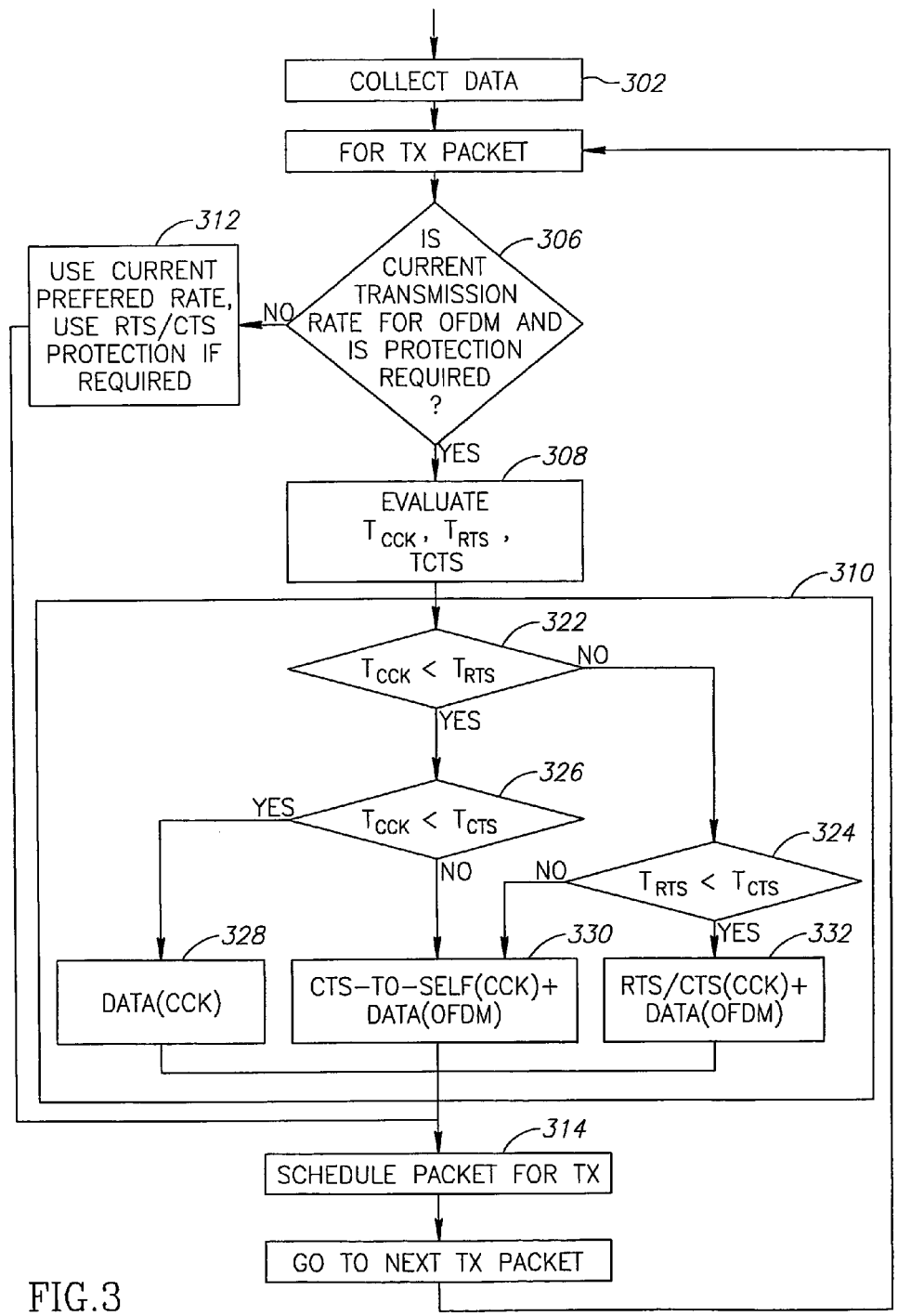
FIG. 3 is a schematic illustration of a flow chart of a method of selecting a modulation type and/or a protection mechanism, in accordance with an exemplary embodiment of the invention.

Reference is also made to FIG. 3, which schematically illustrates a flow chart of a method of selecting a modulation type and/or a protection mechanism, in accordance with an exemplary embodiment of the invention.

According to exemplary embodiments of the invention, the method may be implemented, e.g., by controller 220 when used in conjunction with a "mixed client" communication system, for selecting between modulating the data packet using the OFDM modulation type and protecting the data packet using the RTS/CTS protection mechanism, modulating the data packet using the OFDM modulation type and protecting the data packet using a CTS-to-self protection mechanism, and modulating the data packet using DSSS/CCK modulation. However, it will be appreciated by those skilled in the art that other methods according to exemplary embodiments of the invention may be implemented to select to protect the data packet using one of a plurality of any suitable protection mechanisms, or not to protect the data packet.

As indicated at block 302, the method may include collecting and/or receiving data, parameters and/or properties about the communication network. The data collected may include, for example, transmission packets, transmission frames and/or transmission data received, e.g., by station 200, and/or any other suitable data. The data collected may be used, for example, by channel estimator 218, e.g., to estimate the channel attributes, by hidden node detector 216, e.g., to detect a "hidden node", and/or by collision estimator 214, e.g., to estimate the collision probability P. The data collected may also include legacy instructions regarding the presence of one or more legacy stations in the communication system. These legacy instructions may be received, for example, from AP 110 (FIG. 1).

As indicated at block 306, the method may include determining whether the current preferred transmission rate includes a transmission rate for OFDM, e.g., as described above, and whether legacy protection is required, i.e., whether one or more legacy stations are present in the communication system, e.g., based on the legacy instructions received from AP 110.

As indicated at block 312, if a current preferred transmission rate does not include a transmission rate for OFDM and/or no legacy protection is required, then the data packet may be modulated using a modulation type corresponding to the current preferred transmission rate, e.g., as is known in the art. For example, if the current preferred transmission rate does not include a transmission rate for OFDM, then the data packet may be modulated using the DSSS/CCK modulation type. If the current preferred transmission rate includes a transmission rate for OFDM and no legacy protection is required, then the data packet may be modulated using the OPDM modulation type. The data packet may also be protected using the RTS/CTS protection mechanism, for example, if one or more hidden nodes are detected, e.g., by detector 216.

As indicated at block 308, if the current preferred transmission rate includes a transmission rate for OFDM and legacy protection is required, then the method may include estimating an expected time period, $T_{CTS}$, for successfully transmitting the data packet if modulated using the OFDM modulation and protected using the CTS-to-itself protection mechanism, an expected time period, $T_{RTS}$, for successfully transmitting the data packet if modulated using the OFDM modulation and protected using the RTS/CTS protection mechanism, and an expected time period, $T_{CCK}$, for successfully transmitting the data packet if modulated using the DSSS/CCK modulation. In this context, a successful transmission of the data packet may refer to station 200 receiving an ACK message, from the station, e.g., AP 110 (FIG. 1), intended to receive the data packet. If station 200, for example, does not receive an ACK message it may wait for a back-off time period, $T_{backoff}$, as is known in the art, and re-transmit the data packet, e.g., until an ACK message is received.

According to exemplary embodiments of the invention, the time periods $T_{CTS}$, $T_{RTS}$, and/or $T_{CCK}$ may be evaluated as a function of the collision probability P, the rate $r_1$, the rate $r_2$, a length, L, of the data packet, and a basic DSSS/CCK rate, $r_0$, as is known in the art. For example, the following equations may be used for evaluating $T_{CTS}$, $T_{RTS}$, and/or $T_{CCK}$:

$$T_{CTS}(P, L, r_0, r_1, r_2) = \qquad (1)$$
$$(T_{CTS(cck)} + T_{SIFS} + T_{DATA(ofdm)})\frac{1}{1-P} + (T_{SIFS} + T_{ACK(ofdm)}) + T_{Backoff}$$

$$T_{RTS}(P, L, r_0, r_1, r_2) = T_{RTS(cck)}\frac{1}{1-P} + \qquad (2)$$
$$(T_{CTS(CCK)} + T_{SIFS} + T_{DATA(ofdm)} + T_{SIFS} + T_{ACK(ofdm)}) + T_{Backoff}$$

$$Tcck(P, L, r_1) = T_{DATA(cck)}\frac{1}{1-P} + (T_{SIFS} + T_{ACK(cck)}) + T_{Backoff} \qquad (3)$$

wherein:

$T_{CTS(CCK)}$ denotes the time period for transmitting a CTS frame using the DSSS/CCK modulation;

$T_{RTS(CCK)}$ denotes the time period for transmitting a RTS frame using the DSSS/CCK modulation;

$T_{DATA(OFDM)}$ denotes the time period for transmitting the data packet using the OFDM modulation;

$T_{DATA(CCK)}$ denotes the time period for transmitting the data packet using the DSSS/CCK modulation;

$T_{ACK(OFDM)}$ denotes the time period for transmitting the ACK frame using the OFDM modulation;

and $T_{SIFS}$ denotes the Short Inter Frame Space (SIFS) time period, for example, 10 μs, as defined by the 802.11b standard and the 802.11g standard known in the art, or any other prescribed time period.

For example, a transmission time period, denoted $T_{Tx}$, e.g., corresponding to $T_{CTS(CCK)}$, $T_{RTS(CCK)}$, $T_{DATA(OFDM)}$, $T_{DATA(CCK)}$, or $T_{ACK(CCK)}$, may be calculated using the following equation:

$$T_{TX} = T_{phyOverhead} + (L_{MACOverhead} + L_{payload})/r \qquad (4)$$

wherein:

$T_{TX}$ denotes the transmission time period, e.g., $T_{CTS(CCK)}$, $T_{RTS(CCK)}$, $T_{DATA(OFDM)}$, $T_{DATA(CCK)}$, or $T_{ACK(CCK)}$, to be calculated;

$T_{phyOverhead}$ denotes a PHY layer Overhead time period corresponding to $T_{TX}$, as is known in the art;

$L_{MACOverhead}$ denotes a MAC overhead bit-length, as is known in the art;

$L_{payload}$ denotes the length of the transmitted payload, e.g., the data, CTS, RTS, or ACK packet;

and r denotes the rate of $T_{TX}$.

For example, although the invention is not limited by this example, in some embodiments $L_{MACOverhead}$ may equal 368 bits, and $T_{plyOverhead}$ may equal 192 μs, 96 μs, or 24 μs, corresponding to a DSSS/CCK modulation type having a long preamble, a DSSS/CCK modulation type having a short preamble and an OFDM modulation type, respectively.

As indicated at block 310, according of exemplary embodiments of the invention, the method may also include comparing the time periods, $T_{CTS}$, $T_{RTS}$, and/or $T_{CCK}$, and selecting a protection mechanism and/or modulation type corresponding to the shortest one of the time periods $T_{CTS}$, $T_{RTS}$, and/or $T_{CCK}$, e.g., as described below. It will be appreciated that it may not be necessary to determine $T_{backoff}$ in order to compare Equations 1, 2, and 3, since each of the Equations includes an addition of $T_{backoff}$.

According to exemplary embodiments of the invention, the method may include determining if $T_{CCK} < T_{RTS}$, as indicated at block 322.

If, $T_{CCK} < T_{RTS}$, then the method may further include determining if $T_{CCK} < T_{CTS}$, as indicated at block 326. If $T_{CCK} < T_{CTS}$, then the method may further include selecting the DSSS/CCK modulation type, as indicated at block 328.

If $T_{CCK} ? T_{CTS}$, then the method may further include selecting the OFDM modulation and the CTS-to-self protection mechanism, as indicated at block 330.

If $T_{CCK} ? T_{RTS}$, then the method may further include determining if $T_{RTS} < T_{CTS}$, as indicated at block 324.

If $T_{RTS} < T_{CTS}$, then the method may further include selecting the OFDM modulation type and the RTS/CTS protection mechanism, as indicated at block 332.

If $T_{RTS} ? T_{CTS}$, then the method may further include selecting the OFDM modulation and the CTS-to-self protection mechanism, as indicated at block 330.

As indicated at block 314, the data packet may be scheduled for transmission. This may include, for example, modulating the data packet using the selected modulation type, and/or protecting the data packet using the selected protection mechanism.

Although the above description refers to exemplary embodiments of the invention, wherein the criterion for selecting the protection mechanism and/or the modulation type corresponds to an expected transmission time period, it will be appreciated by those skilled in the art that according to other embodiments of the invention, the modulation type and/or protection mechanism may be selected based on any other suitable criteria, for example, expected power consumption level, as described below.

According to some exemplary embodiments of the invention, the method may include evaluating an expected power consumption level, $P_{CTS}$, for successfully transmitting the data packet if modulated using the OFDM modulation and protected using the CTS-to-itself protection mechanism, an expected power consumption level, $P_{RTS}$, for successfully transmitting the data packet if modulated using the OFDM modulation and protected using the RTS/CTS protection mechanism, and an expected power consumption level, $P_{CCK}$, for successfully transmitting the data packet if modulated using the DSSS/CCK modulation. The power consumption levels $P_{CTS}$, $P_{RTS}$, and/or $P_{CCK}$ may be evaluated as a function of the collision probability P, the rate $r_1$, the rate $r_2$, the length, L, and the rate, $r_0$. For example, the following equations may be used for estimating $P_{CTS}$, $P_{RTS}$, and/or $P_{CCK}$:

$$P_{CTS}(P, L, r_0, r_1, r_2) = \qquad (5)$$
$$(K_{Tx} * T_{CTS(cck)} + K_{Rx} * T_{SIFS} + K_{Tx}T_{DATA(ofdm)})\frac{1}{1-P} +$$
$$K_{Rx} * (T_{SIFS} + T_{ACK(ofdm)}) + K_{Rx} * T_{Backoff}$$

$$P_{RTS}(P, L, r_0, r_1, r_2) = \qquad (6)$$
$$K_{Tx} * T_{RTS(cck)}\frac{1}{1-P} + K_{Rx} * (T_{CTS(CCK)} + T_{SIFS}) +$$
$$K_{Tx} * T_{DATA(ofdm)} + K_{Rx} * (T_{SIFS} + T_{ACK(ofdm)}) + K_{Rx} * T_{Backoff}$$

$$Pcck(P, L, r_1) = \qquad (7)$$
$$K_{TX} * T_{DATA(cck)}\frac{1}{1-P} + K_{Rx}(T_{SIFS} + T_{ACK(cck)}) + K_{Rx} * T_{Backoff}$$

wherein $K_{Tx}$ denotes a power consumption level of the station, e.g., station 200, when transmitting a packet, e.g., a data packet or a RTS packet, and $K_{Rx}$ denotes a power consumption level of the station, e.g., station 200, when receiving a packet, e.g., an ACK, or CTS packet. For example, although the invention is not limited by this example, in some embodiments $K_{Tx}$ may equal 1.3 Watts, and/or $K_{Rx}$ may equal 0.8 Watts.

The method according to these exemplary embodiments may also include comparing the power consumption levels, $P_{CTS}$, $P_{RTS}$, and/or $P_{CCK}$, and selecting a protection mechanism and/or modulation type corresponding to the lowest power consumption level, e.g., in analogy to the above description of block 310 (FIG. 3).

It will be appreciated by those skilled in the art that the method apparatus and/or system according to exemplary embodiments of the invention may provide an increased throughput, e.g., when implemented in conjunction with a "mixed client" communication system, in comparison to conventional methods apparatuses and/or systems, which may use the same protection mechanism to protect a data packet to be transmitted in the "mixed client" system.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method for protecting packet transmissions by a multi-mode wireless communication station operating in a wireless network, the multi-mode wireless communication station configurable to transmit using either orthogonal frequency division multiplexed (OFDM) modulation or direct sequence spread spectrum/complementary code keying (DSSS/CCK) modulation, the method comprising:
   collecting information to identify a legacy communication station currently operating in the network;
   estimating a first time period ($T_{CTS}$) to successfully transmit a data packet using the OFDM modulation with request-to-send/clear-to-send (RTS/CTS) protection, estimating a second time period ($T_{RTS}$) to successfully transmit the data packet using the OFDM modulation with CTS-to-self protection, and estimating a third time period ($T_{CCK}$) to successfully transmit the packet using the DSSS/CCK modulation without protection; and
   selecting the modulation and protection having the shortest of the time period for transmitting the data packet when a legacy communication station has been identified.

2. The method of claim 1, wherein collecting information comprises the multi-mode communication station being informed in a beacon transmission that one or more legacy communication stations are operating in the wireless network;
   wherein the first, second and third time periods are estimated when at least one legacy communication station is operating,
   wherein when no legacy communication stations are operating, the first, second and third time periods are not estimated and the method comprises selecting OFDM modulation with RTS/CTS for transmission of the data packet, and
   wherein legacy communication stations communicate using DSSS/CCK modulation.

3. The method of claim 2,
   wherein collecting information frirther comprises collecting information to identify any hidden nodes currently operating in the network, and
   wherein the method further comprises selecting OFDM modulation with RTS/CTS protection for transmission of the data packet when a hidden node is detected.

4. The method of claim 2, wherein estimating further comprises estimating a power consumption for successful transmission of said data packet associated with each of the time periods.

5. The method of claim 3, wherein estimating comprises estimating each of the time periods based on one or more of a length of said data packet, a collision probability, and a rate of the associated modulation.

6. A multi-mode wireless communication station operating in a wireless network, the multi-mode wireless communication station configurable to transmit using either orthogonal frequency division multiplexed (OFDM) modulation or direct sequence spread spectrumlcomplementary code keying (DSSS/CCK) modulation, the station comprising;
   a controller configured to: collecting information to identify a legacy communication station currently operating in the network;
   the controller further configured to estimate first time period ($T_{CTS}$) to successfull transmit a data packet using the OFDM modulation with request-to-send/clear-to-send (RTS/CTS) protection, estimating a second time period ($T_{RTS}$) to successfully transmit the data packet using the OFDM modulation with CTS-to-self protection, and estimating a third time period ($T_{CCK}$) to successfully transmit the packet using the DSSS/CCK modulation without protection; and
   the controller further configured to select the modulation and protection having the shortest of the time period for transmitting the data packet when a legacy communication station has been identified.

7. The multi-mode wireless communication station of claim 6, wherein the controller collects information from a beacon transmission indicating that one or more legacy communication stations are operating in the wireless network;
   wherein the first, second and third time periods are estimated by the controller when at least one legacy communication station is operating,
   wherein when no legacy communication stations are operating, the first, second and third time periods are not estimated by the controller and the controller selects OFDM modulation with RTS/CTS for transmission of the data packet, and
   wherein legacy communication stations communicate using DSSS/CCK modulation.

8. The multi-mode wireless communication station of claim 7, wherein the controller is further configured to collect information to identify any hidden nodes currently operating in the network, and
   wherein the controller is configured to select OFDM modulation with RTS/CTS protection for transmission of the data packet when a hidden node is detected.

9. The multi-mode wireless communication station of claim 7, wherein said controller is configured to estimate each of the time periods based on one or more of a length of said data packet, a collision probability, and a rate of the associated modulation type.

10. The multi-mode wireless communication station of claim 7, wherein the controller is further configured to estimate a power consumption for successful transmission of said data packet associated with each of the time periods.

* * * * *

UNITED STATES PATENT AND TRADEMARK OFFICE
CERTIFICATE OF CORRECTION

PATENT NO. : 7,489,650 B2  Page 1 of 1
APPLICATION NO. : 10/810687
DATED : February 10, 2009
INVENTOR(S) : Ginzburg et al.

It is certified that error appears in the above-identified patent and that said Letters Patent is hereby corrected as shown below:

In column 10, line 7, in Claim 3, delete "frirther" and insert -- further --, therefor.

In column 10, line 18, in Claim 5, delete "3," and insert -- 2, --, therefor.

In column 10, line 26, in Claim 6, delete "spectrumlcomplementary" and insert -- spectrum/complementary --, therefor.

In column 10, line 27, in Claim 6, after "comprising" delete ";" and insert -- : --, therefor.

In column 10, line 32, in Claim 6, delete "successfull" and insert -- successfully --, therefor.

In column 11, line 3, in Claim 9, after "modulation" delete "type".

Signed and Sealed this

Seventh Day of April, 2009

JOHN DOLL
*Acting Director of the United States Patent and Trademark Office*